(12) United States Patent
Tran

(10) Patent No.: US 8,849,659 B2
(45) Date of Patent: Sep. 30, 2014

(54) SPOKEN MOBILE ENGINE FOR ANALYZING A MULTIMEDIA DATA STREAM

(75) Inventor: Bao Q. Tran, Saratoga, CA (US)

(73) Assignee: Muse Green Investments LLC, Dover, DE (US)

( * ) Notice: Subject to any disclaimer, the term of this patent is extended or adjusted under 35 U.S.C. 154(b) by 570 days.

(21) Appl. No.: 12/834,827

(22) Filed: Jul. 12, 2010

(65) Prior Publication Data

US 2011/0166860 A1 Jul. 7, 2011

Related U.S. Application Data

(63) Continuation-in-part of application No. 11/369,104, filed on Mar. 6, 2006, now Pat. No. 7,761,293.

(51) Int. Cl.

| | | |
|---|---|---|
| *G10L 15/22* | (2006.01) | |
| *G06F 17/30* | (2006.01) | |
| *A63F 13/12* | (2006.01) | |
| *G06Q 30/02* | (2012.01) | |
| *H04M 3/493* | (2006.01) | |
| *H04W 88/02* | (2009.01) | |
| *H04M 1/725* | (2006.01) | |
| *H04W 4/18* | (2009.01) | |
| *H04W 4/12* | (2009.01) | |

(52) U.S. Cl.
CPC .......... *H04M 1/72572* (2013.01); *H04W 88/02* (2013.01); *H04M 2250/74* (2013.01); *H04M 1/72547* (2013.01); *G06Q 30/0209* (2013.01); *H04M 2207/18* (2013.01); *H04W 4/18* (2013.01); *H04W 4/12* (2013.01); *H04M 2250/10* (2013.01); *H04M 3/4938* (2013.01); *G06Q 30/0251* (2013.01)

USPC .......... 704/231; 704/270.1; 704/275; 463/39; 707/715

(58) Field of Classification Search
CPC ......... G10L 15/11; G10L 25/51; G06F 17/30; G06F 17/30041; A63F 13/12; A63F 2300/204; A63F 2300/205
USPC ...................... 704/231, 243, 270.1, 278, 275; 707/706, 721, 715; 463/40, 42, 39
See application file for complete search history.

(56) References Cited

U.S. PATENT DOCUMENTS

| | | | |
|---|---|---|---|
| 6,070,140 | A | 5/2000 | Tran |
| 6,108,631 | A | 8/2000 | Rühl |
| 6,408,272 | B1 | 6/2002 | White |
| 6,532,446 | B1 | 3/2003 | King |
| 6,650,892 | B1 * | 11/2003 | Thiriet ........................ 455/419 |
| 6,757,718 | B1 * | 6/2004 | Halverson et al. ............ 709/218 |

(Continued)

OTHER PUBLICATIONS

"Logix Mobile Frequently Asked Questions," <http://www.logixmobile.com/faq/show.asp?catid=1&faqid=3> [retrieved Feb. 11, 2006], 2 pages.

(Continued)

*Primary Examiner* — Martin Lerner
(74) *Attorney, Agent, or Firm* — Christensen O'Connor Johnson Kindness PLLC

(57) ABSTRACT

Systems and methods are disclosed to operate a mobile device by capturing user input, transmitting the user input over a wireless channel to an engine, analyzing at the engine a music clip or video in a multimedia stream, and sending an analysis wirelessly to the mobile device.

27 Claims, 8 Drawing Sheets

(56) References Cited

U.S. PATENT DOCUMENTS

| | | | |
|---|---|---|---|
| 6,829,243 B1 | 12/2004 | Sundhar | |
| 6,970,871 B1 | 11/2005 | Rayburn | |
| 6,980,984 B1 | 12/2005 | Huffman | |
| 7,231,229 B1 | 6/2007 | Hawkins | |
| 7,254,618 B1* | 8/2007 | Swenson et al. | 709/217 |
| 7,328,155 B2* | 2/2008 | Endo et al. | 704/251 |
| 7,340,455 B2* | 3/2008 | Platt et al. | 348/207.99 |
| 7,460,863 B2 | 12/2008 | Steelberg | |
| 7,483,946 B2 | 1/2009 | Boyd | |
| 7,664,872 B2* | 2/2010 | Osborne et al. | 709/232 |
| 7,761,293 B2* | 7/2010 | Tran | 704/231 |
| 2002/0032592 A1 | 3/2002 | Krasnick | |
| 2002/0116196 A1 | 8/2002 | Tran | |
| 2003/0060238 A1 | 3/2003 | McCarthy | |
| 2003/0125958 A1 | 7/2003 | Alpdemir | |
| 2003/0144047 A1* | 7/2003 | Sprogis | 463/9 |
| 2004/0237121 A1* | 11/2004 | Liao et al. | 725/135 |
| 2005/0077968 A1 | 4/2005 | Behzad | |
| 2005/0125234 A1* | 6/2005 | Endo et al. | 704/275 |
| 2005/0143097 A1 | 6/2005 | Wilson | |
| 2005/0207432 A1 | 9/2005 | Velez-Rivera | |
| 2005/0228716 A1 | 10/2005 | Endler | |
| 2005/0245241 A1 | 11/2005 | Durand | |
| 2005/0266831 A1 | 12/2005 | Roth | |
| 2005/0266863 A1 | 12/2005 | Benco | |
| 2006/0074660 A1 | 4/2006 | Waters | |
| 2006/0074760 A1 | 4/2006 | Helin | |
| 2006/0077968 A1 | 4/2006 | Pitsoulakis | |
| 2006/0084507 A1* | 4/2006 | Miyazaki | 463/43 |
| 2006/0085261 A1 | 4/2006 | Chu | |
| 2006/0100871 A1 | 5/2006 | Choi | |
| 2006/0148568 A1* | 7/2006 | Schultz et al. | 463/42 |
| 2006/0155597 A1 | 7/2006 | Gleason | |
| 2006/0165379 A1* | 7/2006 | Agnihotri et al. | 386/95 |
| 2006/0170778 A1 | 8/2006 | Ely | |
| 2006/0218126 A1* | 9/2006 | De Ruijter et al. | 707/3 |
| 2007/0005363 A1 | 1/2007 | Cucerzan | |
| 2007/0021166 A1 | 1/2007 | Mattila | |
| 2007/0027889 A1 | 2/2007 | Kaufman | |
| 2007/0100808 A1 | 5/2007 | Balogh | |
| 2007/0167204 A1 | 7/2007 | Lyle | |
| 2007/0192168 A1 | 8/2007 | Van Luchene | |
| 2007/0208564 A1 | 9/2007 | Tran | |
| 2007/0239692 A1 | 10/2007 | McBride | |
| 2007/0248220 A1 | 10/2007 | Crandell | |
| 2007/0287477 A1 | 12/2007 | Tran | |
| 2008/0156173 A1* | 7/2008 | Bauer | 84/601 |
| 2008/0177994 A1 | 7/2008 | Mayer | |
| 2008/0183706 A1 | 7/2008 | Dong | |
| 2008/0228689 A1* | 9/2008 | Tewary et al. | 706/48 |
| 2008/0285527 A1* | 11/2008 | Sammarco | 370/338 |
| 2009/0005080 A1 | 1/2009 | Forstall | |
| 2009/0055376 A1* | 2/2009 | Slaney et al. | 707/5 |
| 2009/0144273 A1* | 6/2009 | Kappos | 707/5 |
| 2010/0023144 A1* | 1/2010 | Waites | 700/94 |

OTHER PUBLICATIONS

"UPSNAP Frequently Asked Questions," <http://upsnap.com/faq.htm> [retrieved Feb. 10, 2006], 7 pages.

* cited by examiner

SPOKEN MOBILE ENGINE FOR ANALYZING A MULTIMEDIA DATA STREAM

This application is a continuation-in-part of U.S. patent application Ser. No. 11/369,104, filed Mar. 6, 2006, now U.S. Pat. No. 7,761,293 entitled "SPOKEN MOBILE ENGINE" which is related to U.S. patent application Ser. No. 11/340,336, filed Jan. 26, 2006, now abandoned, entitled "CELLULAR DEVICE WITH BROADCAST RADIO OR TV RECEIVER," U.S. patent application Ser. No. 11/323,789, filed Dec. 30, 2005, entitled "WIRELESS MOBILE VIDEO," and U.S. patent application Ser. No. 11/369,028, filed Mar. 6, 2006, now abandoned, entitled "MULTIMEDIA TELEPHONE."

BACKGROUND

Short Message Service (SMS) is a mechanism for delivery of short messages over mobile networks and provides the ability to send and receive text messages to and from mobile telephones. SMS was created as part of the GSM Phase 1 standard. Each short message is up to 160 characters in length for Latin character messages. The 160 characters can comprise of words, numbers, or punctuation symbols. Short messages can also be non-text based, such as binary. The Short Message Service is a store and forward service and messages are not sent directly to the recipient but through a network SMS Center. This enables messages to be delivered to the recipient if their phone is not switched on or if they are out of coverage at the time the message was sent—so called asynchronous messaging, just like email. Confirmation of message delivery is another feature and means the sender can receive a return message notifying them whether the short message has been delivered or not. In some circumstances multiple short messages can be concatenated (stringing several short messages together).

In addition to SMS, Smart Messaging (from Nokia), EMS (Enhanced Messaging System), and MMS (Multimedia Messaging Service) have emerged. MMS adds images, text, audio clips and ultimately, video clips to SMS (Short Message Service/text messaging). Nokia created a proprietary extension to SMS called 'Smart Messaging' that is available on more recent Nokia phones. Smart messaging is used for services like Over The Air (OTA) service configuration, phone updates, picture messaging, operator logos, etc. Smart Messaging is rendered over conventional SMS and does not need the operator to upgrade their infrastructure. SMS eventually will evolve toward MMS, which is accepted as a standard by the 3GPP standard. MMS enables the sending of messages with rich media such as sounds, pictures, and eventually, even video. MMS itself is emerging in two phases, depending on the underlying bearer technology—the first phase being based on GPRS (2.5G) as a bearer, rather than 3G. This means that initially MMS will be very similar to a short PowerPoint presentation on a mobile phone (i.e., a series of "slides" featuring color graphics and sound). Once 3G is deployed, sophisticated features like streaming video can be introduced. The road from SMS to MMS involves an optional evolutionary path called EMS (Enhanced Messaging System). EMS is also a standard accepted by the 3GPP.

SUMMARY

In one aspect, systems and methods are disclosed to operate a mobile device by capturing user input; transmitting the user input over a wireless channel to an engine, analyzing at the engine music clip or video in a multimedia data stream and sending an analysis wirelessly to the mobile device.

In another aspect, systems and methods are disclosed to operate a mobile device. The system includes a message center; an engine coupled to the message center; and a mobile device wirelessly coupled to the message center, wherein the engine specifies one or more meeting locations and wherein at least one meeting location comprises a location designated by an advertiser.

In yet another aspect, systems and methods are disclosed to operate a mobile device by capturing user speech; converting the user speech into one or more speech symbols; transmitting the speech symbols over a wireless messaging channel to an engine (such as a search engine or a game engine, among others); and generating a result based on the speech symbols.

In a further aspect, a system operates a mobile device with a message center; an engine (such as a search engine or a game engine, for example) coupled to the message center; and a mobile device wirelessly coupled to the message center, the mobile device capturing user speech, converting the user speech into one or more speech symbols; transmitting the speech symbols over a wireless messaging channel to the engine; and receiving a search result from the engine based on the speech symbols.

Implementations of the above aspects may include one or more of the following. The disambiguating symbol can be a location. The system can develop recognition accuracy based on the location information. The system can refine the result based on user history. The system can analyze usage pattern from a population of users to refine the result. The result can be ranked based on payment by an entity that is the target of the search. The system can search for one of: services, people, products, and companies. The system can enhance a search for one of: services, people, products, and companies by tailoring the search with one of: telephone area code, zip code, airport code. The system can also enhance a search for one of: services, people, products, and companies by tailoring the search with automated position determination. The automated position determination can include triangulation based location determination, WiFi location determination, GPS, assisted GPS, GLONASS, assisted GLONASS, GALILEO, or assisted GALILEO.

Advantages of the system may include one or more of the following. The above system allows the user to use his/her voice instead of a limited keypad for inputting a full set of typographical characters, as such keypad entry can be very cumbersome and time consuming, e.g., with multiple keystrokes having to be entered to type a single character. The system is easy to use when the query is long. For searching, the search result provided by such verbal query is customized to the user's disambiguating data such as location data to provide useful on-the-go information to the user. Upon request, the system can also forward the user's request to the companies found in the search for call-back, thus increasing the call-through rate for advertisement purposes. For gaming, the game result can be customized according to the user's verbal instruction and the position information. The system can drive gamers in hunt of virtual treasures or virtual objectives to play the games at a predetermined location such as a concert event, a sports event, or a particular establishment such as Starbucks, McDonalds, Walmart, Sears, K-Mart, or any other businesses that are interested in driving potential customers to their physical location.

DESCRIPTION

Figure 1:
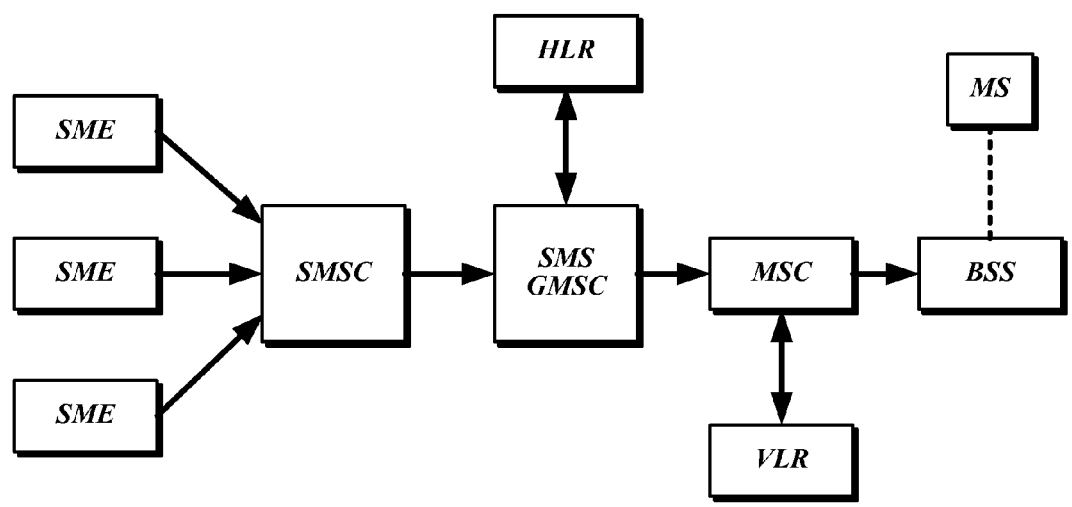
FIG. 1 shows a typical organization of network elements in a GSM network.

FIG. 1 shows an organization of network elements in a GSM network supporting messaging such as SMS. It is a store and forward way of transmitting messages to and from mobiles. The message (text only) from the sending mobile is stored in a central short message center (SMSC) which then forwards it to the destination mobile. The SMSC stores/forwards messages to and from the mobile station. The SME (Short Message Entity), which is typically a mobile phone or a GSM modem, can be located in the fixed network or a mobile station, and receives and sends short messages. The SMS GMSC (SMS gateway MSC) is a gateway MSC (Mobile Switching Center) that can also receive short messages. The gateway MSC is a mobile network's point of contact with other networks. On receiving the short message from the short message center, GMSC uses the SS7 network to interrogate the current position of the mobile station from the HLR, the home location register. HLR is the main database in a mobile network. It holds information of the subscription profile of the mobile and also about the routing information for the subscriber, i.e., the area (covered by a MSC) where the mobile is currently situated. The GMSC is thus able to pass on the message to the correct MSC. The MSC (Mobile Switching Center) is the entity in a GSM network which does the job of switching connections between mobile stations or between mobile stations and the fixed network. A VLR (Visitor Location Register) corresponds to each MSC and contains temporary information about the mobile, information like mobile identification and the cell (or a group of cells) where the mobile is currently situated. Using information from the VLR, the MSC is able to switch the information (short message) to the corresponding BSS (Base Station System, BSC+BTSs), which transmits the short message to the mobile. The BSS comprises transceivers, which send and receive information over the air interface, to and from the mobile station. This information is passed over the signaling channels so the mobile can receive messages even if a voice or data call is going on.

Figure 2A:
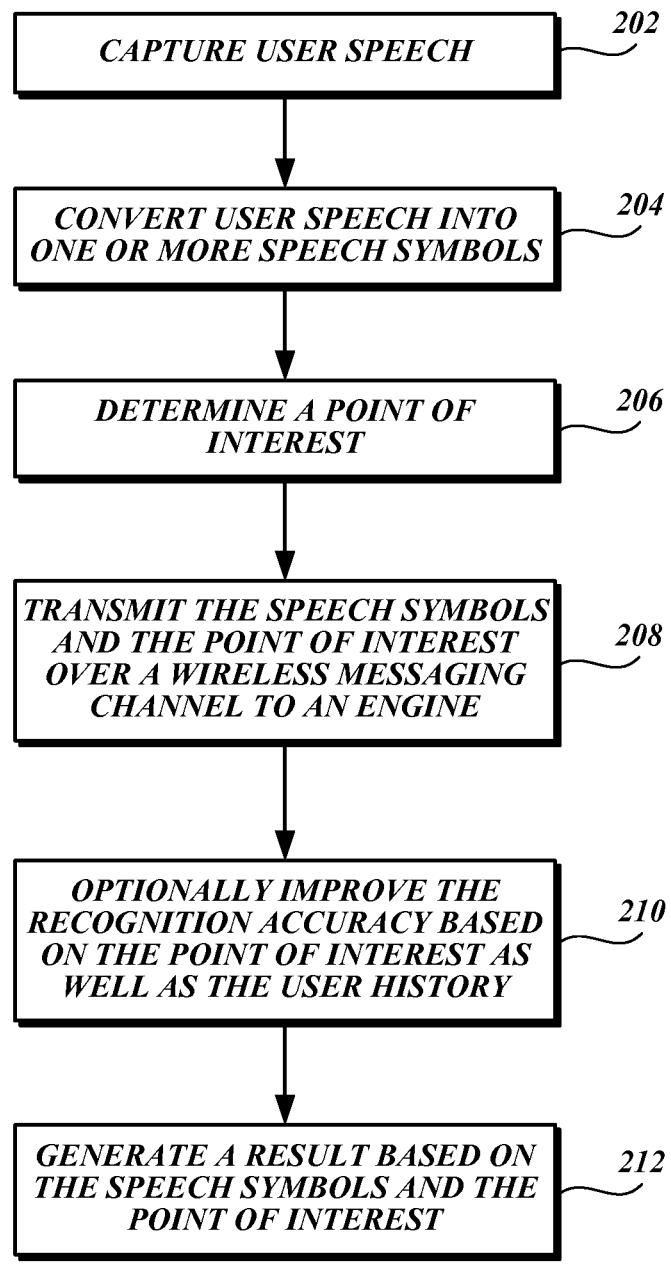
FIG. 2A shows a representative process for communicating speech to a remote server for determining user commands.

FIG. 2A shows a representative process for communicating speech to a remote server for determining user commands. The process captures user speech in step 202 and converts user speech into one or more speech symbols in step 204. The speech symbols can be phonemes, diphones, triphones, syllables, and demisyllables. The symbols can be LPC cepstral coefficients, or MEL cepstrum coding technique can be used as symbols as well. More details on the conversion of user speech into symbols are disclosed in U.S. Pat. No. 6,070,140 entitled "Speech Recognizer" by the inventor of the instant application, the content of which is incorporated by reference.

Next, the process determines a point of interest such as an XY coordinate, a city name, a zip code, or an address in step 206. The process transmits the speech symbols and the point of interest over a wireless messaging channel to a search engine in step 208. The search engine can perform speech recognition and can optionally improve the recognition accuracy based on the point of interest as well as the user history in step 210. For example, if the user pronounces "Starbucks 95135" to try to locate a Starbucks coffee shop in the area with zip code 95135, the system based on prior user requests, would initiate a search query for Starbucks in the area with zip code 95135. The system generates a search result based on the speech symbols and the point of interest in step 212. The user can scroll the search results and identify the entity that he/she would like to contact. Alternatively, the user can press a button to indicate that the entity should call back the user.

In one embodiment, merchants pay the operator of the system for the privilege of calling the user back. Consumers simply elect to be called back by a merchant, by selecting the merchant. The server then bridges the mobile phone with the merchant automatically. The service is useful when traveling or when the user is unable to write down a number. Merchants pay to have their listings first. The user still gets listings for all merchants in the category he or she selects.

Figure 2B:
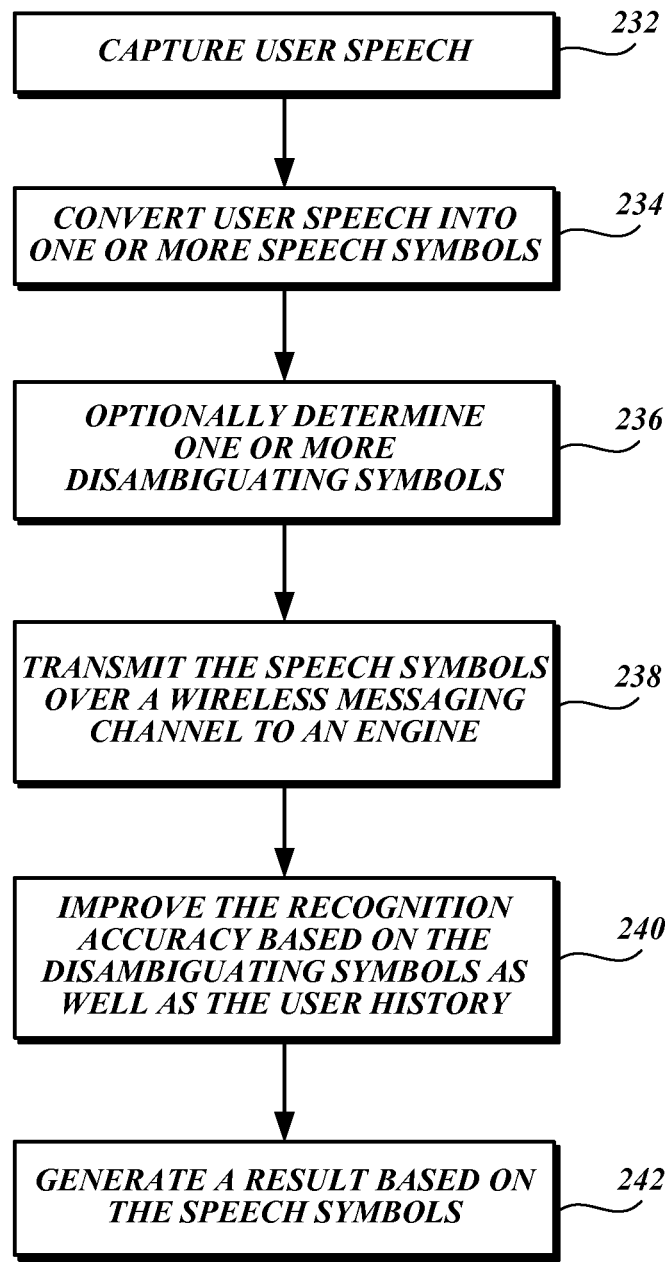
FIG. 2B shows another representative process for communicating speech to a remote server for determining user commands.

FIG. 2B shows another representative process for communicating speech to a remote server for determining user commands. Similar to the process of FIG. 2A, the process captures user speech in step 232 and converts the user speech into one or more speech symbols in step 234. Next, the process optionally determines one or more disambiguating symbols such as location symbols that help refine the subsequent speech recognition and game or search operation in step 236. The disambiguating symbols can be location related symbols such as XY coordinates, GPS coordinates, zip code, area code, and city name, among others.

Next, the process transmits the speech symbols and the disambiguating symbols over a wireless messaging channel to a suitable engine such as a game engine or a search engine in step 238. The process improves the recognition accuracy based on the disambiguating symbols as well as the user history in step 240. Finally, the process generates a search result based on the speech symbols and the disambiguating symbols in step 242.

In addition to free text search, the system can also search predefined categories as well as undefined categories. For example, the predefined categories can be sports, stocks, flight status, package tracking, price comparison, weather, yellow pages, movie show times, wifi hotspots, news, hotel reservations, drink recipes, jokes, horoscopes, or pickup lines, for example.

In yet other embodiments, the voice search system can provide mobile access to virtually any type of live and on-demand audio content, including Internet-based streaming audio, radio, television, or other audio source. Wireless users can listen to their favorite music, catch up on the latest news, or follow their favorite sports.

The system can also automatically send information to the mobile device via text messages. An alert can be created for specific sports teams, leagues, weather reports, horoscopes, stock quotes, and more. Alerts can be set on a regular delivery schedule or for event-triggers such as stock quote and sports score changes. Event-triggered alerts keep users informed about real-time changes to things that they care about. For example, sports alerts can provide instant updates at the end of a period, inning, quarter, half, game, or golf round for MLB, NBA, NFL, NHL, PGA, and all major college sports, and provide instant updates when the score changes (excluding NBA); and Stock Alerts may include instant updates for user-specified stocks or funds at market open and/or close, or instant updates for designated percentage change in price or specified price targets, among others. By giving users the choice to receive event-triggered alerts, users can stay current on the latest changes in their portfolio or with their favorite teams, and they can make more informed decisions, save time, and stay in the know continuously about subjects and events that are important to them. Event-triggered alerts are an addition to periodic alerts that can be scheduled for delivery at the time and preference of the user. Periodic alerts include 5-day weather forecasts, daily horoscopes, plus sports and stock alerts that can be set at a time of day instead of an event.

In one implementation, an audio alert can be sent. First, an SMS notification (text) announcing the alert is sent to the subscriber's cell phone. A connection is made to the live or on-demand audio stream. The user listens to the announcement as a live or on-demand stream. The system provides mobile phone users with access to live and on-demand streaming audio in categories such as music, news, sports, entertainment, religion, and international programming. Users may listen to their favorite music, catch up on latest news, or follow their sports team. The system creates opportunities for content providers and service providers, such as wireless carriers, with a growing content network and an existing and flourishing user base. Text-based or online offerings may be enhanced by streaming live and on-demand audio content to wireless users.

Figure 3:
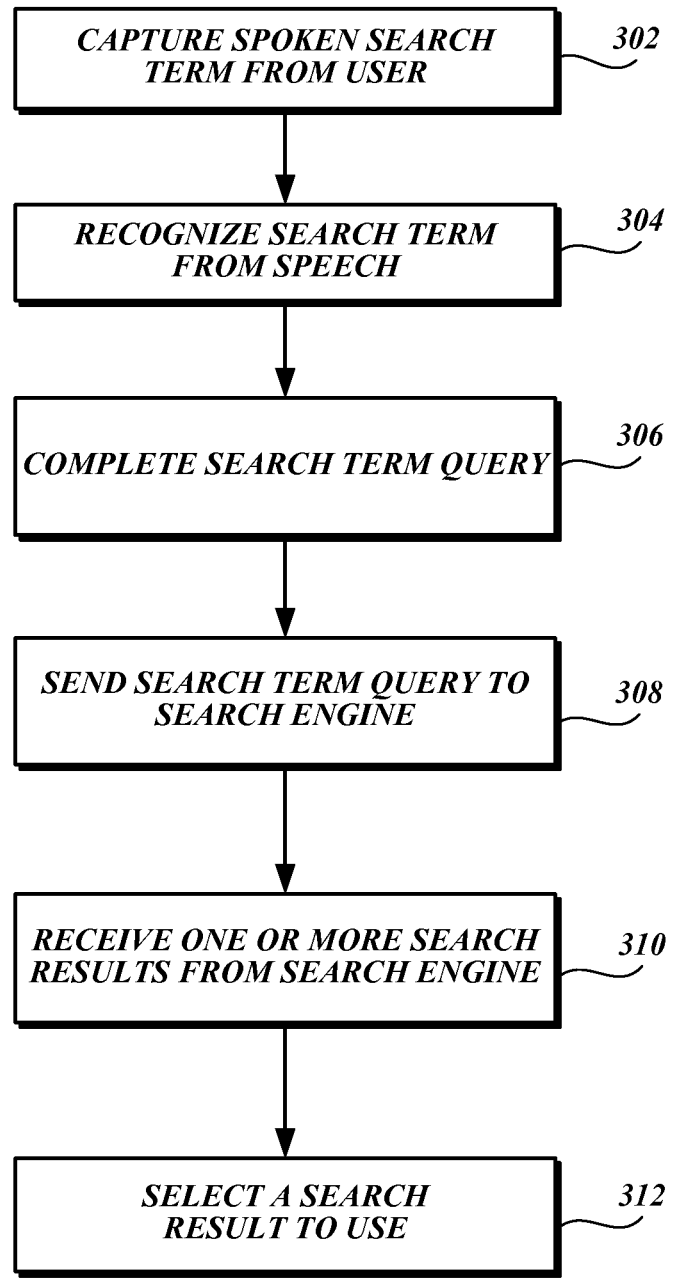
FIG. 3 shows another representative process in accordance with one embodiment of a mobile system such as a cell phone that can perform verbal searches.

FIG. 3 shows another representative process in accordance with one embodiment of a mobile system such as a cell phone that can perform verbal mobile phone searches. First, the mobile system captures spoken speech from a user relating to a desired search term in step 302. A speech recognition engine recognizes the search term from the user's spoken request in step 304. The system then completes a search term query in step 306 as needed. The system then sends the complete search term query to one or more search engines in step 308. The search engine can be a taxonomy search engine as described below. The system retrieves one or more search results from the search engine(s) in step 310, and presents the search result(s) to the user in step 312. The user can view or call the person or business associated with the desired search result.

In one implementation, if the user is interested in searching for a store called "Starbucks" in the current vicinity of the user, he/she would speak "Starbucks" to the mobile system computer, the system recognizes that the user is looking for Starbucks in his/her vicinity and would automatically determine its current position and append the position into the search term query. Hence, by speaking "Starbucks", the system would determine the location of the cell phone and create a query search for Starbucks in San Francisco, for example. In this manner the user can search for services, people, products, and companies that are local to her or him with minimum effort.

In an implementation where the location information is manually entered, the system that interprets the user request intelligently. For example the user can search for services, people, products, and companies by telephone area code, by Zip Code, or by airport code. For example, to find a store called "Starbucks" in San Francisco, the user can speak to the cell phone:

Starbucks san francisco CA
Starbucks san fran (does partial match no state)
Starbucks 415 (by area code)
Starbucks 94118 (by Zip Code)
Starbucks SFO (by airport code)

In the event the system cannot understand the request, the system presents a template with the pre-formatted search string and the user can edit the template and submit the search request in the template format.

Figure 4A:
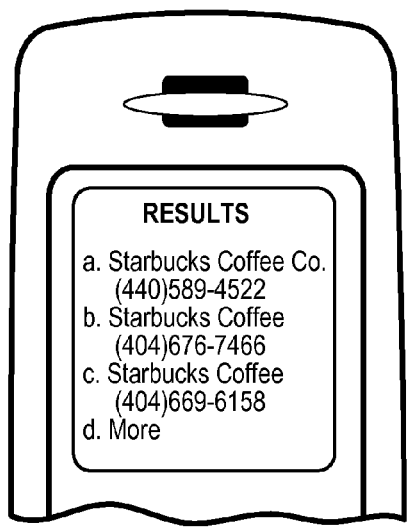
FIGS. 4A-4C show representative results of a voice based search.
Figure 4B:
Figure 4C:
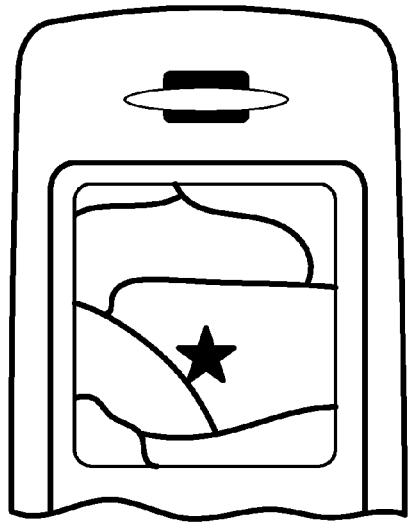

FIGS. 4A-4C show representative results of a voice based search. In this example, the user pronounces "Starbucks" and the system responds with search results in FIG. 4A. For more detail, the user can press a key or reply with a one letter reply of his or her choice. FIG. 4B shows an example expansion when choice 'a' of FIG. 4A is selected. The representative result shown in FIG. 4B includes an address and phone number. The result can also be a map as shown in FIG. 4C or directions from the user's current position to the target address in other implementations. In other examples, the user can pronounce "Starbucks" along with a zip code, city, or name such as "Starbucks 30342", "Starbucks Atlanta" or "Starbucks 404" and the result would be the same as those in FIGS. 4A-4B.

Figure 5:
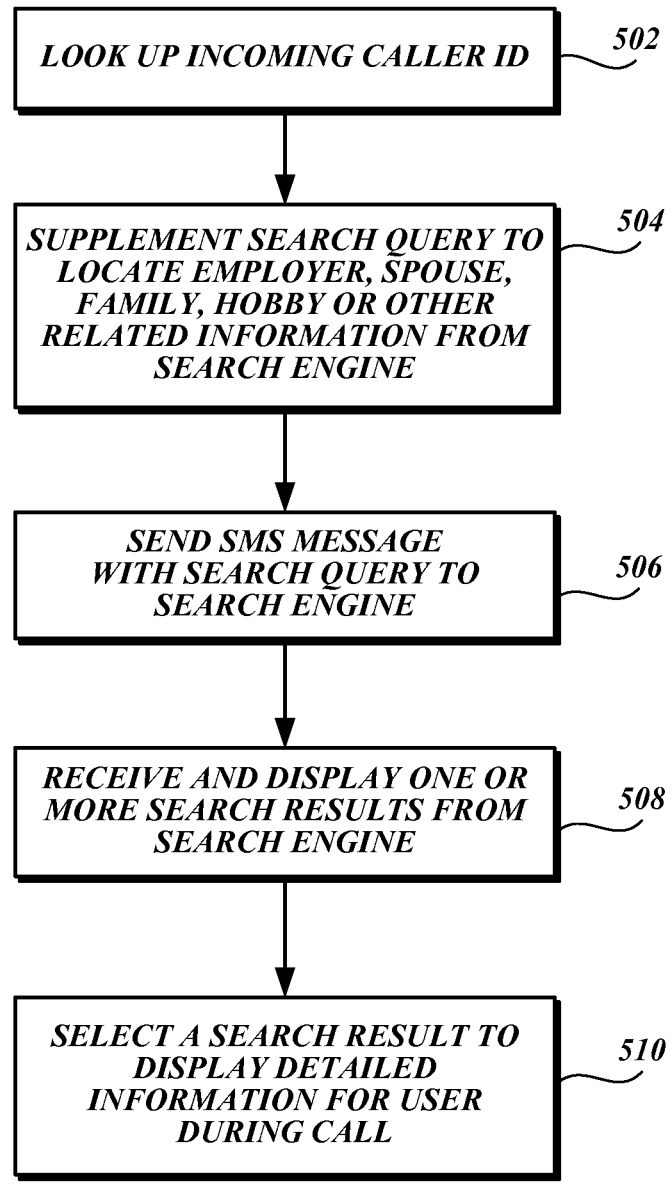
FIG. 5 shows a representative reverse name look up system for directory assistance.

FIG. 5 shows a representative reverse look up system. When the user receives an incoming call, the system looks up incoming caller ID in step 502. This can be done using a telephone directory search in a database or in the cell phone's contact file. Alternatively, the system can search based on the name pronounced by the user's greeting speech. Next, the system supplements a Search Query to locate Employer, Spouse, Family, Hobby, or Other Related Information from a Search Engine in step 504. The system sends an SMS Message with the Search Query to the Search Engine in step 506. The system then receives and displays one or more Search Results from the Search Engine in step 508. The system allows the user to scroll and select a Search Result to display more detailed information to the user during the call in step 510.

In addition to SMS or MMS, the system can work with XHTML, Extensible Hypertext Markup Language, also known as WAP 2.0, or it can work with WML, Wireless Markup Language, also known as WAP 1.2. XHTML and WML are formats used to create Web pages that can be displayed in a mobile Web browser. This means that Web pages can be scaled down to fit the phone screen.

In one embodiment, the search engine is a taxonomy search engine (TSE). TSE is a web service approach to federating taxonomic databases such as Google or specialized databases from retailers, for example. The system takes the voice based query (expressed in phonemes, for example), converts the speech symbols into query text and the query is sent to a number of different databases, asking each one whether they contain results for that query. Each database has its own way of returning information about a topic, but the details are hidden from the user. TSE converts the speech symbols into a search query and looks up the query using a number of independent taxonomic databases. One embodiment uses a wrapper-mediator architecture, where there is a wrapper for each external database. This wrapper converts the query into terms understood by the database and then translates the result into a standard format for a mediator which selects appropriate information to be used and formats the information for rendering on a mobile phone.

The growth of computer networks and increases in computer processing power has led to the development of many databases or repositories of digitized or electronic images, graphics, music, and videos. However, searching such multimedia files is still difficult. In one embodiment, a system locates a predetermined multimedia file by having users upload a plurality of image, music, and video files to a server, each file including multimedia data such as image or video or audio data and metadata describing the content; extracting the multi-media data and metadata from the multimedia files; updating a search engine index with the metadata; and subsequently locating the predetermined multimedia file using the search engine.

In another embodiment, as part of the content upload, the user captures and edits video taken with a camcorder, camera, or cell phone. The user performs simple edits to the video segment. The system allows the editing user more creative freedom at each step in the process, such as being able to preview and correct each edit decision on the fly. The video editing process becomes similar to putting together a document or graphics presentation where the user cuts and pastes the segments together adding effects and titles.

The software can provide Linear Editing where the content can only be edited sequentially similar to older mechanical techniques of cutting films to perform the edit functions. The software can alternatively provide Non-Linear Editing where editing in this environment is a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying). This process requires, at the least, a Camcorder and VCR. The original footage remains intact, but the rearranged footage is transferred to a new tape. Each scene or cut is "assembled" on a blank tape either one-at-a-time or in a sequence. The system can provide two types of Assemble Editing: 1) A Roll—Editing from a single source, with the option of adding an effect, such as titles or transitioning from a frozen image to the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the title between scenes previously shot during the editing process.

The system supports Sound Mixing where two or more sound sources can be connected to a sound mixer and then inputted into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents can to be reduced into chunks of one, five, ten, or fifteen minutes, for example, to allow easy viewing while the user is traveling or otherwise does not have full attention on the device for an extended period. In one embodiment, video is microchunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The microchunks can be e-mailed, linked to, searched for, downloaded, remixed, and made available on-line.

The user or producer can embed metadata into the video or music. Representative metadata for video or musical content, such as CDs, includes artist information such as the name and a list of albums available by that artist. Another metadata is album information for the title, creator, and Track List. Track metadata describes one audio track and each track can have a title, track number, creator, and track ID. Other representative metadata includes the duration of a track in milliseconds. The metadata can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The metadata can contain release status information with possible values of: StatusOfficial, StatusPromotion, StatusBootleg. Other metadata can be included as well.

The metadata can be entered by the musician, the producer, the record company, or by a music listener or purchaser of the music. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The metadata associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalties on behalf of its users and supports the webcasting of music according to the Digital Millennium Copyright Act, 17 U.S.C. 114. The system obtains a statutory license for the non-interactive streaming of sound recordings from Sound Exchange, the organization designated by the U.S. Copyright Office to collect and distribute statutory royalties to sound recording copyright owners and featured and non featured artists. The system is also licensed for all U.S. musical composition performance royalties through its licenses with ASCAP, BMI, and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips, and/or videos. The system also identifies music clips or videos in a multimedia data stream and prepares a summary of each music video that includes relevant image, music, or video information. The user can search the music using the verbal search system discussed above. Also, for game playing, the system can play the music or the microchunks of video in accordance with a search engine or a game engine instruction to provide better gaming enjoyment.

In one gaming embodiment, one or more accelerometers may be used to detect a scene change during a video game running within the mobile device. For example, the accelerometers can be used in a tilt-display control application where the user tilts the mobile phone to provide an input to the game. In another gaming embodiment, mobile games determine the current position of the mobile device and allow players to establish geofences around a building, city block, or city, to protect their virtual assets. The mobile network such as the WiFi network or the cellular network allows players across the globe to form crews to work with or against one another. In another embodiment, a digital camera enables users to take pictures of themselves and friends, and then map each digital photograph's looks into a character model in the game. Other augmented reality games can be played with position information as well.

In addition to SMS or MMS, the system can work with XHTML, Extensible Hypertext Markup Language, also known as WAP 2.0, or it can work with WML, Wireless Markup Language, also known as WAP 1.2. XHTML and WML are formats used to create Web pages that can be displayed in a mobile Web browser. This means that Web pages can be scaled down to fit the phone screen.

In one embodiment, the search engine is a taxonomy search engine (TSE). TSE is a web service approach to federating taxonomic databases such as Google or specialized databases from retailers, for example. The system takes the voice based query (expressed in phonemes, for example), converts the speech symbols into query text and the query is sent to a number of different databases, asking each one whether they contain results for that query. Each database has its own way of returning information about a topic, but the details are hidden from the user. TSE converts the speech symbols into a search query and looks up the query using a number of independent taxonomic databases. One embodiment uses a wrapper-mediator architecture, where there is a wrapper for each external database. This wrapper converts the query into terms understood by the database and then translates the result into a standard format for a mediator which selects appropriate information to be used and formats the information for rendering on a mobile phone.

In another embodiment, the system can handle structured and unstructured databases. The system uses ontologies, each of which is a vocabulary detailing all the significant words for a particular domain, like healthcare or music or video or a consumer item, and the relationship between each word. The system then recognizes these terms in their particular context.

A plurality of ontology systems can be used: one ontology to analyze unstructured information, another to analyze databases or other structured information, and a third to unify the two by data sets. So while a music listener can think of 'U2' as a band, a cell phone can think of 'U2' as a ring-tone, a newspaper might refer to a 'U2' for an incident, and a military database might use the terms 'U2' for a spying plane, among others. In one implementation, the system semi-automatically builds and maintains domain specific ontologies. The system performs automatic detection and extraction of events in textual data, and integrates the textual temporal information which has been extracted in a document warehouse. The system provides temporal knowledge discovery of items for trends analysis.

In one aspect, the system semi-automatically builds and maintains domain specific ontologies. The system automatically generates ontology by examining numerous samples of the type of information typically being searched. The system then analyzes and produces a provisional ontology, which can be adjusted by users' acceptance or rejection of the search results to create a definitive ontology.

In another representative TSE, the system searches taxonomic databases that are related together. For instance, if the telephone user enters "U2", the system based on the ontological and/or taxonomical knowledge of "U2" searches databases relating to music, and locating music vendors of similar content as search results. The search results are provided as a series of links that are displayed on the telephone for the user to select. In one option, the user can select an item and request the vendor to call the user back to complete the sales transaction. In another option, the system automatically fills in an order form and displays to the user for approval prior to submitting the information to the selected vendor. In one implementation, the vendor in turn pays a commission to the system for the sales referral.

In one embodiment, the system includes a multidimensional knowledge map. The knowledge map includes concepts. The concepts are organized into taxonomies. Each taxonomy includes a hierarchical structure. One taxonomy can be a first concept that is ordered with respect to a second concept independent of the hierarchical structure. The content provider system also includes content items. The items can be tagged to the concepts using a value of a structured data attribute associated with the items. In one example, the tagged item is selected from the group consisting of a user query, a user attribute, and a resource. In another example, the item is tagged to at least one of the concepts using at least one keyword included in the item. In another example, the first concept includes a first mapping function including an input and an output. The input of the first mapping function includes a value of a structured data attribute of at least one item. The output of the first mapping function indicates whether to tag the item to the first concept. In a further example, the second concept includes a second mapping function. The second mapping function includes an input and an output. The input of the second mapping function includes a value of a structured data attribute of at least one item. The output of the mapping function indicates whether to tag the at least one item to the second concept, such that the at least one item tagged to the first concept is ordered with respect to the at least one item tagged to the second concept. In one example, the input of the first mapping function includes information obtained from a source external to the system that is used in providing the output of the first mapping function. In another example, the input of the first mapping function uses information about how the at least one item tags to other concepts in providing the output of the first mapping function. In a further example, the input of the first mapping function uses information about at least one keyword included in the at least one item in providing the output of the first mapping function.

The system can have a multidimensional knowledge map. The system can execute a process that includes organizing concepts into groups representing dimensions of a domain, including ordering a first concept with respect to a second concept in the same group, using at least one structured data parameter, tagging at least one item to at least one of the first and second concepts, and constraining a user's search to only one of the first and second concepts. In another embodiment, one or more items are tagged to at least one of the first and second concepts based at least in part on a first structured data parameter that is modified based on an indication derived from at least one previous user's interaction with the system. In one variation on this embodiment, the tagging is also based on at least one of: a second structured data parameter, language associated with the item, and a second tag associated with the at least one item. In another example, the tagging is also based on at least one of whether the at least one previous user's interaction with the system was deemed successful and context information obtained from a dialog interaction with the at least one previous user. In one embodiment, a gateway provides the search service to POTS/PSTN telephone callers with minimum modification of the existing system.

In one embodiment, an inquiry can be entered by a telephone user. The telephone user can type the inquiry on the telephone keypad or speak the inquiry to the phone. In one embodiment, the spoken inquiry is captured by the server and speech recognition software at the server can convert the spoken inquiry into text and sent back to the display of the phone for confirmation. In another embodiment, the spoken inquiry can be converted into phonetic equivalent and transmitted as a message such as SMS message or email or WAP message to the server. As noted, the inquiry can be a natural language query, a boolean logic query specifying one or more search terms, or any combination thereof. The server then processes the received inquiry. For example, the inquiry can be parsed to identify keywords, search terms, and boolean operators. If the inquiry is a natural language inquiry, the language can be grammatically parsed to identify likely search terms and discard words which are not relevant to the subject or domain of the inquiry.

Next, the server can determine whether a relevant taxonomy model exists. In particular, using the search terms, the server can examine previously determined taxonomy models to determine whether the domains, types, and/or sub-types of an existing taxonomy model include any common information such as search terms. This determination can be performed with reference to a dictionary and thesaurus databases. That is, the search for an existing taxonomy model can be expanded to include terms specified by the dictionary and/or thesaurus databases which are synonymous and/or related to terms of the inquiry. Accordingly, although an inquiry may not include terminology that is identical to an existing taxonomy model, the server can identify related models by cross referencing the taxonomy model terminology with the inquiry terminology using the dictionary and thesaurus databases. As the dictionary and thesaurus databases can include both predetermined information as well as user configured information, the user can specify relationships between terms and domains such that the server can identify relationships among inquiries and existing taxonomy models despite the existence of only an indirect relationship between the inquiry and taxonomy model.

If one or more existing taxonomy models are found to have an association with the received inquiry, the identified taxonomy models can be used as a seed or basis for generating a new taxonomy model. In particular, attributes from the identified taxonomy models can be used as a baseline model. For example, Internet sites, search engines, databases, and/or Web pages used in the existing taxonomy model can be given higher priority than had no related taxonomy model been identified. Similarly, previously identified relationships between domain types, domain subtypes, and text passages of the existing taxonomy model can be re-examined by the server and used in recursive searches to be described herein in greater detail.

If no existing taxonomy model is relevant to the inquiry, a new taxonomy model is initialized. The server can access the dictionary database and the thesaurus database to identify alternative search terms and phrases to those specified in the inquiry. Accordingly, the server can broaden the scope of the inquiry to encompass synonymous, related, and/or relevant terms without requiring the user to specify an unduly large or complex inquiry. As the dictionary and thesaurus databases can include references to designated search engines suited to the subject matter of that entry, the server further can identify those search target engines which will be searched in response to the broadened inquiry. For example, if the user types "U2", the server searches all music related sites for the available albums from "U2" since the search came from a phone and users are unlikely to search for U2 spy-planes on a telephone. The user can be more specific and enter "U2 review" and the system would search Google or Yahoo or MSN search engines for reviews of the band, sort/filter/remove redundancy and present articles that the user can review on the rather limited screen of the telephone. Thus, the user can do research using the limited I/O of the phone if necessary, but the default is to assume that the user wants assistance to buy or to get to a particular location rather than to do in-depth research on the limited telephone screen and keypad.

The server can generate and send queries based upon the initial user inquiry. The server can access the rules of the query protocol database to determine the query format associated with the target search engines. Accordingly the server can translate the received inquiry into one or more queries to be directed to the target search engines. Thus, each resulting query can conform to the format required by the particular search engine to which the query is to be directed.

Results from the various target search engines can be received by the server. For example, from each of the target search engines, the server can receive a listing of references in response to the queries provided. The received references can be processed and prioritized. For example, the server can merge the various lists of URLs into a single list, remove duplicate URLs, and prioritize the remaining list according to the prioritization hierarchy specified by the research rules. Copies of the references specified by the processed listing of references can be retrieved. The text of the retrieved references can be extracted by removing any formatting tags or other embedded electronic document overhead. For example, any visual formatting of the text, content labeling of the data, or other data annotations can be removed from the retrieved references.

The server can take a course of action given the existence of particular word and/or text associations within a text passage including, but not limited to acronyms, syntactic variants, synonyms, semantic variants, and domain associations. For example, the rules can specify that a search is to be initiated for each identified acronym such that the resulting taxonomy model and report include information about the acronyms. Acronyms can be identified by identifying terms in all capital letters, using grammatical rules, and/or by specifying the terms within the dictionary and/or thesaurus databases.

Each of the aforementioned word and/or text associations identified within relevant text passages can be recursively identified within newly determined search results and recursively submitted to the various search engines to progressively acquire additional information. Taking another example, an original query for "jazz" can reveal that Acid Jazz, Avant Garde & Free Jazz, Bebop, Brazilian Jazz, Cool Jazz, Jazz Fusion, Jazz Jam Bands, Latin Jazz, Modem Post-bebop, New Orleans Jazz, Smooth Jazz, Soul-Jazz & Boogaloo, Swing Jazz, Traditional Jazz & Ragtime, and Vocal Jazz are relevant terms. In this example, the system may recursively submit queries for each type of jazz music to progressively acquire further facts. The system may identify the top ten purchased or downloaded musicians in a particular jazz music type and present that as the search sub-result to the user. The system is also aware of URLs of top retailers for a particular band and can add these URLs into the search sequence on a periodic basis such as on a daily or hourly basis.

After having identified the relationships as well as the domain types and subtypes, a taxonomy model can be generated to summarize information discovered as a result of the inquiry. The taxonomy model can be formulated as a relational graph where nodes representing domain types are linked with child nodes clustered around the domain type. The child nodes represent the domain subtypes. Each of the nodes, whether a domain type or a domain sub-type, can include one or more attributes. Any incidental terms occurring infrequently can be pruned from the taxonomy model. Accordingly, the resulting clusters of domain types and domain sub-types represent the hierarchy between general and more specific concepts.

Off-line, the server can analyze the taxonomy model to identify patterns within the taxonomy model to provide faster and more accurate search results. The rules can specify particular relationships of interest in the taxonomy model. For example, the research rules can indicate that attributes which co-occur within one concept may be relevant to peer concepts, that concepts which share common attributes may form clusters of potential significance, relationships which divide clusters into mutually exclusive subsets are potentially significant, or relationships which generate intersections among distinct clusters are potentially significant. The server can formulate additional subqueries to provide the target search engines. For example, the sub-queries can specify new combinations of search terms such as domain types, domain subtypes, and attributes as determined from the research rules and the relational graph. Representative pattern rules can include "if type X has attribute Y, then search for other types with attributes of Y" and "if type X has attribute Y, then search for X having an attribute Y with alternative values for Y." Continuing with the previous example, execution of the representative pattern rules can generate sub-queries such as "are there other items like U2 band." The results of the sub-queries can be incorporated into the existing taxonomy model.

The determined taxonomy model can be presented to a system administrator for approval. The administrator can add elements to the taxonomy model, delete elements from the taxonomy model, and/or reorder the contents of the taxonomy model. Once the model is accepted by the administrator, edits to the taxonomy model can be incorporated. A report can be generated for review and can include the relational graph of the taxonomy model, a taxonomy outlining the domain of the taxonomy model, text descriptions of concepts, attributes and relationships, as well as citations linking derived results to the original source documents. The resulting taxonomy model and research report can be stored for subsequent use.

The search result is accurate and provides relevant information for the needs of a telephone user. The system brings the advantages of the Internet to telephones that are designed to work over the POTS/PSTN network. One such benefit is the ability to access Internet search engines for POTS/PSTN phones. It lends itself to various embodiments, each of which delivers the information in a text data format but in a different interface manner. The use of a gateway connection between the server and the POTS network provides the greatest degree of service expansion in that the text data may be provided in conjunction with a standard audio delivery, or it may be provided as a direct access database in which no voice call is involved. This is a high value added service which is of immediate benefit to both the client and the telephone service provider. In consideration of its high value and in the flexibility of its delivery, the telephone service provider has a variety of options in charging for the service. This may include a flat monthly subscription fee for all subscribers which eliminates the need for transaction billing, reducing both the service cost to the provider as well as the service charge to the customer.

In another aspect, a telephone system for making free VOIP calls includes a handset with a display, a keypad, and a modem communicating with a remote server. The user can make local and long distance calls for free and in addition may have access to value added services that include but are not limited to music, food, restaurant, movie, map, telephone directory, news, blogs, weather, stocks, calendar, sports, horoscopes, lottery, messages, or traffic database. The display of the phone periodically shows information of interest to the user (such as ads), based on a profile that the user makes when registering with the system. The profile is updated to track services and products that the user actually uses.

Other revenue models can be used. In one embodiment, the system acts as brokers or market-makers: the system brings buyers and sellers together and facilitates transactions. Brokers play a frequent role in business-to-business (B2B), business-to-consumer (B2C), or consumer-to-consumer (C2C) markets. Usually a broker charges a fee or commission for each transaction it enables. The formula for fees can vary. Brokerage models include: Buy/Sell Fulfillment—takes customer orders to buy or sell a product or service, including terms like price and delivery; Demand Collection System—where a prospective buyer makes a final (binding) bid for a specified good or service, and the broker arranges fulfillment; Auction Broker—conducts auctions for sellers (individuals or merchants), Broker charges the seller a listing fee and commission scaled with the value of the transaction; Transaction Broker—provides a third-party payment mechanism for buyers and sellers to settle a transaction; Distributor—a catalog operation that connects a large number of product manufacturers with volume and retail buyers and where Broker facilitates business transactions between franchised distributors and their trading partners; Search Agent—a software agent or "robot" used to search-out the price and availability for a good or service specified by the buyer, or to locate hard to find information; and Virtual Marketplace—or virtual mall, a hosting service for online merchants that charges setup, monthly listing, and/or transaction fees.

Alternatively, an advertising model can be used where advertisers pay for referrals or clicks from the telephone. A high volume of user traffic makes advertising profitable and permits further diversification of site services. For example, the system can search classifieds—list items for sale or wanted for purchase. In another embodiment, the system provides free access but requires users to register and provide demographic data. Registration allows inter-session tracking of user surfing habits and thereby generates data of potential value in targeted advertising campaigns. The system can also support Contextual Advertising/Behavioral Marketing. For example, a telephone extension that automates authentication and form fill-ins, also delivers advertising links or pop-ups as the user surfs the web. Contextual advertisers can sell targeted advertising based on an individual user's surfing activity. The system can support Content-Targeted Advertising that identifies the meaning of a web page and then automatically delivers relevant ads when a user visits that page. The system can display Intromercials—animated full-screen ads placed at the entry of a site before a user reaches the intended content.

In another business model, the system acts as an Infomediary that provides data about consumers and their consumption habits used to target marketing campaigns. Independently collected data about producers and their products are useful to consumers when considering a purchase.

In another embodiment, the system provides Incentive Marketing—customer loyalty program that provides incentives to customers such as redeemable points or coupons for making purchases from associated retailers. Data collected about users is sold for targeted advertising. The system can also be a Metamediary that facilitates transactions between buyer and sellers by providing comprehensive information and ancillary services, without being involved in the actual exchange of goods or services between the parties.

The system can also be a merchant, wholesalers and retailers of goods and services. Sales may be made based on list prices or through auction. The system can also be a merchant that deals strictly in digital products and services and, in its purest form, conducts both sales and distribution of contents such as music/video/call tone/ring tone over the web.

The system performs automatic detection and extraction of events in textual data, and integrates the textual temporal information which has been extracted in a document database. The system provides temporal knowledge discovery of items for trends analysis.

The system can use ontology with non-text information as well. Many repositories of digitized or electronic images, graphics, music, and videos have been built. However, searching such multimedia files is still difficult. In one embodiment, the system performs speech recognition on the video and converts speech into text for searching. The converted text is stored as meta-tags associated with the music or video, and upon selection in response to a search, the music or video can be displayed for playing or for purchase.

In another embodiment, a system locates a predetermined multimedia file by having users upload a plurality of image, music, and video files to a server, each file including multi-media data such as image or video or audio data and metadata describing the content; extracting the multi-media data and metadata from the multimedia files; updating a search engine index with the metadata; and subsequently locating the predetermined multimedia file using the search engine.

Figure 6:
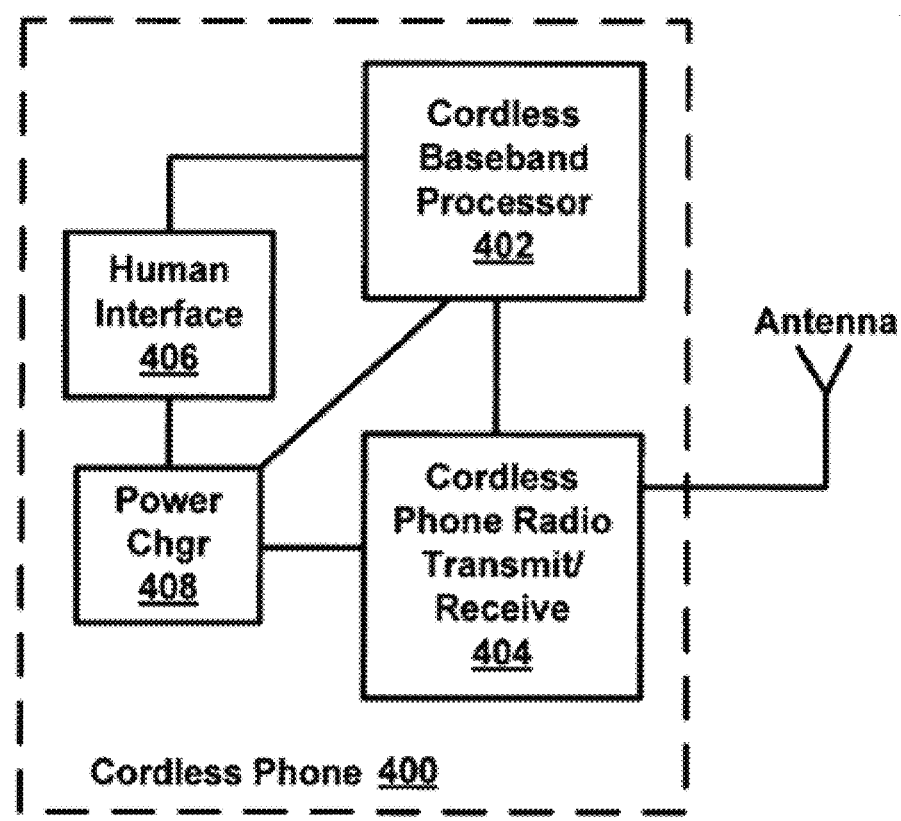
FIG. 6 is a block diagram of a representative cordless telephone device.

FIG. 6 is a block diagram of a cordless telephone device 400. The cordless telephone device 400 includes a cordless baseband processor 402, a cordless phone radio transmit/receive block 404, a human interface 406, and a power charger 408. The cordless telephone device 400 may be capable of answering one or more calls by selecting line 1 or line 2 in addition to using a key sequence (e.g., *8) to switch between the calls or an analog line. The cordless telephone device 400 may be capable of receiving distinctive ring tones and forwarding them to the human interface 406 visually or via melody or distinctive ring pattern. The cordless telephone device 400 can receive data and displaying the data over IP or other cordless interfaces.

The cordless telephone device 400 can be connected to a plain old telephone service (POTS) or a public switched telephone network (PSTN), the telephone having a modem through the transmit/receive block 404. A server communicates with the cordless telephone device 400 over the POTS or PSTN, the server receiving a search query from the cordless telephone device 400; searching one or more databases based on the search query and returning a search result to display on the human interface 406.

Figure 7:
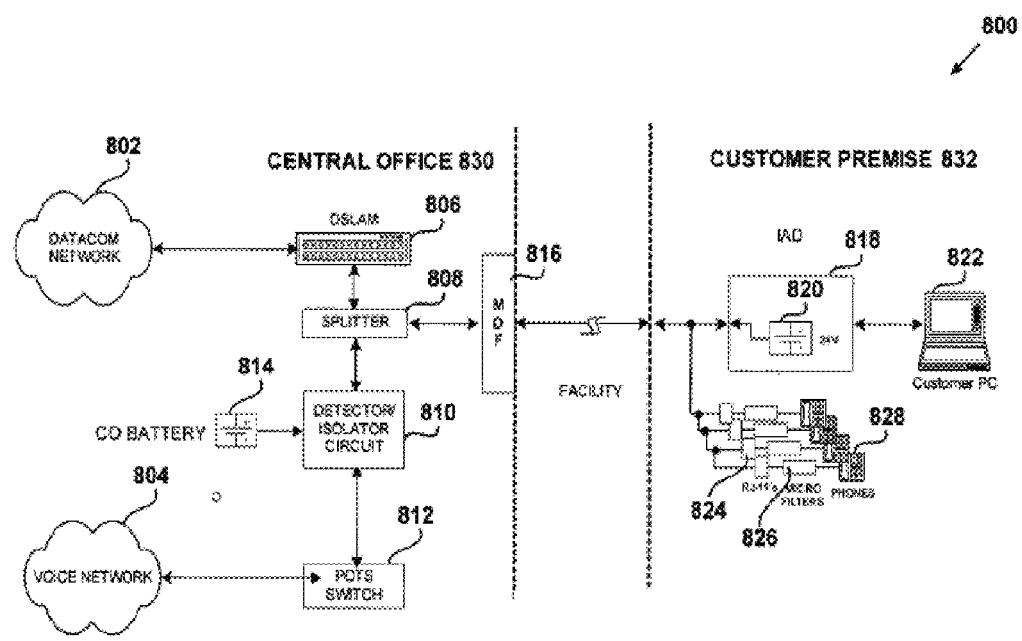
FIG. 7 shows a telephone network.

FIG. 7 is a block diagram of a representative telephone network 800. The network or distribution system 800 includes a Central Office 830 and a Customer Premise 832. The Customer Premise 832 includes an IAD 818, which has a battery 820. The in-home wiring is connected to the IAD 818, which provides the interface with a personal computer 822 and/or other devices that communicate using a data network. The in-home wiring is also connected to an RJ-11 jack 824, which is connected to a DSL filter 826, which in turn is connected to a standard POTS telephone 828. As shown in FIG. 7, any number of telephone connections may be found in the home or office.

The Central Office 830 includes a Digital Subscriber Line Access Multiplexer (DSLAM) 806, a splitter 808, an isolator circuit 810, a battery 814, and a POTS switch 812. The Central Office 830 is connected to a data network 802 (including wide area network such as the Internet) via the DSLAM 806 and a voice network 804 via the POTS switch 812. The data network 802 allows the Central Office 830 to communicate with various external databases (such as amazon.com, yahoo.com, and other sites for books, music, and video as well as search engines such as google.com, among others). Additionally, the Central Office 830 is connected to the Customer Premises 832 via a Main Distribution Frame (MDF) 816. The MDF 816 is the termination point for external trunk cables entering the Central Office 830.

When the IAD 818 is not present in the Customer Premises 832, the isolator circuit 810 allows analog POTS service to pass through normally. However, once the IAD 818 is installed and presents a voltage signal (typically, 24 volts) via the battery 820 onto the tip and ring lines, the isolator circuit 810 detects a voltage differential between the Central Office 830 and the IAD 818. Upon detection of the voltage differential, the isolator circuit 810 activates a relay to disconnect the POTS switch 812 from the isolator circuit 810. While this example uses DC signaling to initiate the isolation function, other communication techniques could also be used, such as using tones. Once the isolator circuit 810 is activated, calls made from any telephone in the home are routed through the IAD 818, converted to VOIP, and sent out to the Internet via DSL transport through the DSLAM 806. The DSLAM 806 is a device for taking connections from many customers and aggregating them into a single, high-capacity connection to the Internet. The DSLAM 806 may provide additional functions, such as routing and dynamic IP address assignment. By including the isolation function to the Central Office 830, installation is simplified. For example, to install the isolator circuit 810 into the customer premises, such as the NID, a service technician travels to the home. The Central Office 830 solution eliminates the need to install equipment at the Customer Premises 832. Additional economies may be realized by including the isolator function to the Central Office 830 because one isolator circuit 810 may be used for multiple users.

In another embodiment, the user captures and edits video taken with camcorders, cameras, cordless telephones with cameras, or cellular telephones with cameras. The user performs simple edits to the video segment. The system allows the editing user more creative freedom at each step in the process, such as being able to preview and correct each edit decision on the fly. The video editing process becomes similar to putting together a document or graphics presentation where the user cuts and pastes the segments together adding effects and titles.

The software can provide Linear Editing where the content can only be edited sequentially similar to older mechanical techniques of cutting films to perform the edit functions. The software can alternatively provide Non-Linear Editing where editing in this environment is a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying).

This process requires, at the least, a Camcorder and VCR. The original footage remains intact, but the rearranged footage is transferred to a new tape. Each scene or cut is "assembled" on a blank tape either one-at-a-time or in a sequence. The system can provide two types of Assemble Editing: 1) A Roll—Editing from a single source, with the option of adding an effect, such as titles or transitioning from a frozen image to the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the title between scenes previously shot during the editing process.

The system supports Sound Mixing where two or more sound sources can be connected to a sound mixer and then inputted into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents can be reduced into chunks of one, five, ten, or fifteen minutes, for example, to allow easy viewing while the user is traveling or otherwise don't have full attention on the device for an extended period. In one embodiment, video is micro-chunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The micro-chunks can be e-mailed, linked to, searched for, downloaded, remixed, and made available on-line.

The user or producer can embed metadata into the video or music. Representative metadata for video or musical content, such as CDs, includes artist information such as the name and a list of albums available by that artist. Another metadata is album information for the title, creator, and Track List. Track metadata describes one audio track and each track can have a title, track number, creator, and track ID. Other representative metadata includes the duration of a track in milliseconds. The metadata can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The metadata can contain release status information with possible values of: StatusOfficial, StatusPromotion, StatusBootleg. Other metadata can be included as well.

The metadata can be entered by the musician, the producer, the record company, or by a music listener or purchaser of the music. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The metadata associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalties on behalf of its users and supports the web casting of music according to the Digital Millennium Copyright Act, 17 U.S.C. 114. The system obtains a statutory license for the non-interactive streaming of sound recordings from Sound Exchange, the organization designated by the U.S. Copyright Office to collect and distribute statutory royalties to sound recording copyright owners and featured and non featured artists. The system is also licensed for all U.S. musical composition performance royalties through its licenses with ASCAP, BMI, and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips, and/or videos. The system also identifies music clips or videos in a multimedia data stream and prepares a summary of each music video that includes relevant image, music, or video information. The user can search the music using the verbal search system discussed above. Also, for game playing, the system can play the music or the micro-chunks of video in accordance with a search engine or a game engine instruction to provide better gaming enjoyment.

In one gaming embodiment, one or more accelerometers may be used to detect a scene change during a video game running within the mobile device. For example, the accelerometers can be used in a tilt-display control application where the user tilts the mobile phone to provide an input to the game. In another gaming embodiment, mobile games determine the current position of the mobile device and allow players to establish geofences around a building, city block, or city, to protect their virtual assets. The mobile network such as the WiFi network or the cellular network allows players across the globe to form crews to work with or against one another. In another embodiment, a digital camera enables users to take pictures of themselves and friends, and then map each digital photograph's looks into a character model in the game. Other augmented reality games can be played with position information as well.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by client/server devices. Communication media typically embodies computer readable instructions, data structures, program modules, or other data in a modulated data signal such as a carrier wave or other transport mechanism and includes any information delivery media.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory, or other memory technology, CD-ROM, digital versatile disks (DVD) or other optical storage, magnetic cassettes, magnetic tape, magnetic disk storage, or other magnetic storage devices, or any other medium which can be used to store the desired information and which can be accessed by client/server devices. Communication media typically embodies computer readable instructions, data structures, program modules, or other data in a modulated data signal such as a carrier wave or other transport mechanism and includes any information delivery media.

The above specification, examples and data provide a complete description of the manufacture and use of the composition of the disclosure. Many embodiments of the disclosure can be made without departing from the spirit and scope of the claimed subject matter.

What is claimed is:

1. A method to communicate with a mobile device, comprising:
   receiving at a game engine, mobile device input from the mobile device over a wireless channel, wherein the mobile device input includes a multimedia data stream;
   receiving at the game engine, location information indicating a location of the mobile device, wherein the location information corresponds to the location of a user providing verbal instruction input to the mobile device;
   analyzing an audio clip or video in the multimedia data stream;
   analyzing the location information; and
   sending audio content or video content to the mobile device based at least in part on analysis of the multimedia data stream and the location information in accordance with a game engine instruction.

2. The method of claim 1, further comprising receiving the mobile device input using one of SMS, MMS, XHTML, WML, and WAP.

3. The method of claim 1, further comprising searching a taxonomic database with data on one or more of music, food, restaurant, movie, map, telephone directory, news, blogs, weather, stocks, calendar, sports, horoscopes, lottery, messages, and traffic.

4. The method of claim 1, further comprising analyzing usage patterns from a population of users to refine an analysis result.

5. The method of claim 1, further comprising generating speech symbols as one of phoneme, diphone, triphone, syllable, demisyllable, cepstral coefficient, and cepstrum coefficient.

6. The method of claim 1, further comprising performing automated position determination with one of triangulation based location determination, WiFi location determination, GPS, assisted GPS, GLONASS, assisted GLONASS, GALILEO, and assisted GALILEO.

7. The method of claim 1, wherein the mobile device input comprises data indicative of speech.

8. The method of claim 1, further comprising:
   searching one or more taxonomic databases based on a search query; and
   returning a search result to be displayed on the mobile device.

9. The method of claim 1, further comprising:
   preparing a summary of the audio clip or video including relevant image, music, or video information.

10. The method of claim 1, further comprising searching a taxonomic database with data on one or more of music, movie, map, telephone directory, news, blogs, weather, stocks, sports, horoscopes, and messages.

11. A method comprising:
    capturing mobile device input, wherein the mobile device input includes a multimedia data stream;
    by a mobile device, transmitting the mobile device input over a wireless channel to a game engine;
    by the mobile device, transmitting location information indicating a location of the mobile device, wherein the location information corresponds to the location of a user providing verbal instruction input to the mobile device;
    receiving a result of an analysis of the location information and an analysis of an audio clip or video in the multimedia data stream; and
    by the mobile device, playing audio content or video content based at least in part on the analysis result in accordance with a game engine instruction.

12. The method of claim 11, wherein the method is performed as part of a mobile game.

13. The method of claim 12, wherein the mobile game is configured to send players to a physical location.

14. The method of claim 12, further comprising providing directions to one of a store, a retailer, a company, and a venue.

15. The method of claim 11, further comprising transmitting a verbal search request to the engine.

16. The method of claim 11, further comprising requesting a call back to the mobile device.

17. The method of claim 11, further comprising designating an entity from a search result to call back the mobile device.

18. The method of claim 17, further comprising transmitting the mobile device's caller identification (Caller ID) number to the entity for calling back the mobile device.

19. The method of claim 11, further comprising editing a video on the mobile device.

20. The method of claim 11, further comprising mapping a picture into a character model in a game.

21. The method of claim 11, further comprising transmitting the mobile device input using one of SMS, MMS, XHTML, WML, and WAP.

22. The method of claim 11, further comprising:
    receiving a summary of the audio clip or video including relevant image, music, or video information.

23. A non-transitory computer-readable storage medium having instructions stored thereon that, in response to execution by at least one computing device, cause the at least one computing device to:
    receive mobile device input from a mobile device over a wireless channel, wherein the mobile device input includes a multimedia data stream;
    receive location information indicating a location of the mobile device, wherein the location information corresponds to the location of a user providing verbal instruction input to the mobile device;

analyze an audio clip or video in the multimedia data stream;
analyze the location information; and
send audio content or video content to the mobile device based at least in part on analysis of the multimedia data stream and the location information in accordance with a game engine instruction.

24. The non-transitory computer-readable storage medium of claim 23, wherein the instructions further cause the at least one computing device to:
search one or more taxonomic databases based on a search query; and
return a search result to display on the mobile device.

25. The non-transitory computer-readable storage medium of claim 23, wherein the instructions further cause the at least one computing device to:
prepare a summary of the audio clip or video including relevant image, music, or video information.

26. A non-transitory computer-readable storage medium having instructions stored thereon that, in response to execution by at least one mobile computing device, cause the at least one mobile computing device to:
capture mobile device input, wherein the mobile device input includes a multimedia data stream;
transmit the mobile device input over a wireless channel;
transmit location information indicating a location of the mobile device, wherein the location information corresponds to the location of a user providing verbal instruction input to the mobile device;
receive a result of an analysis of the location information and an analysis of an audio clip or video in the multimedia data stream; and
play audio or video based at least in part on the analysis result in accordance with a game engine instruction.

27. The non-transitory computer-readable storage medium of claim 26, wherein the instructions further cause the at least one computing device to:
receive a summary of the audio clip or video including relevant image, music, or video information.

* * * * *